(12) United States Patent
Suchy

(10) Patent No.: US 9,640,951 B2
(45) Date of Patent: May 2, 2017

(54) TRIGGERING CIRCUIT OF OVERVOLTAGE PROTECTION WITH AN ASYMMETRIC ELEMENT

(71) Applicant: SALTEK S.R.O., Usti nad Labem (CZ)

(72) Inventor: Jaromir Suchy, Usti nad Labem (CZ)

(73) Assignee: SALTEK S.R.O., Usti nad Labem (CZ)

( * ) Notice: Subject to any disclaimer, the term of this patent is extended or adjusted under 35 U.S.C. 154(b) by 0 days.

(21) Appl. No.: 15/108,689

(22) PCT Filed: Dec. 9, 2014

(86) PCT No.: PCT/CZ2014/000151
§ 371 (c)(1),
(2) Date: Jun. 28, 2016

(87) PCT Pub. No.: WO2015/101368
PCT Pub. Date: Jul. 9, 2015

(65) Prior Publication Data
US 2016/0329686 A1    Nov. 10, 2016

(30) Foreign Application Priority Data

Jan. 3, 2014 (CZ) ......................................... 2014-2

(51) Int. Cl.
*H01T 4/12*    (2006.01)
*H01T 4/08*    (2006.01)
(Continued)

(52) U.S. Cl.
CPC ................. *H01T 4/02* (2013.01); *H01T 1/15* (2013.01); *H01T 2/02* (2013.01); *H02H 9/06* (2013.01)

(58) Field of Classification Search
CPC .... H01T 4/12; H01T 4/08; H01T 1/14; H02H 9/06; H01C 7/12
(Continued)

(56) References Cited

U.S. PATENT DOCUMENTS

| 4,652,963 A | * | 3/1987 | Fahlen ..................... H02H 7/16 361/127 |
| 4,683,514 A | * | 7/1987 | Cook ....................... H02H 9/06 361/111 |

(Continued)

FOREIGN PATENT DOCUMENTS

| DE | 202013103823 U1 | 4/2013 |
| JP | 2005063851 A    | 3/2005 |

OTHER PUBLICATIONS

International Search Report (May 19, 2015) for corresponding International App. PCT/CZ2014/000151.

*Primary Examiner* — Dharti Patel
(74) *Attorney, Agent, or Firm* — WRB-IP LLP

(57) ABSTRACT

A triggering circuit of an overvoltage protection device with an asymmetric element, specified for actuating a spark gap in symmetric or asymmetric arrangement of main electrode I, connected to input terminal I, of main electrode II, connected to input terminal II, and the auxiliary electrode, includes main electrode I of the spark gap, which is connected via a thermo-sensitive disconnector, and also via a parallel combination of varistor II and capacitor I to electrode I of the asymmetric three-pole lightning arrester, whose middle electrode is connected via the primary winding of the transformer to main electrode II of the spark gap, whose auxiliary electrode is connected via varistor I to electrode II of the asymmetric three-pole lightning arrester, which is connected via the secondary winding of the transformer to main electrode II of the spark gap, and at the same time, the thermo-sensitive disconnector is coupled via the thermal coupling with varistor II and, at the same time, the voltage at the asymmetric three-pole lightning arrester is as follows: static ignition voltage U1 between electrode II and the middle electrode is higher than static ignition voltage U2 between the middle electrode and electrode I.

7 Claims, 5 Drawing Sheets

(51) Int. Cl.
*H01T 1/14* (2006.01)
*H02H 9/06* (2006.01)
*H01T 4/02* (2006.01)
*H01T 1/15* (2006.01)
*H01T 2/02* (2006.01)

(58) Field of Classification Search
USPC .......................................................... 361/128
See application file for complete search history.

(56) References Cited

U.S. PATENT DOCUMENTS

| | | | | |
|---|---|---|---|---|
| 6,111,740 | A * | 8/2000 | Danowsky | H01T 2/02 361/111 |
| 7,755,873 | B2 * | 7/2010 | Crevenat | H01T 2/02 361/111 |
| 8,102,635 | B2 * | 1/2012 | Hallstrom | H01T 2/02 361/117 |
| 2009/0154044 | A1 * | 6/2009 | Crevenat | H02H 9/06 361/91.1 |
| 2009/0292438 | A1 * | 11/2009 | Nolte | F02D 35/021 701/101 |
| 2015/0288176 | A1 * | 10/2015 | Durth | H01C 7/10 361/91.2 |

* cited by examiner

TRIGGERING CIRCUIT OF OVERVOLTAGE PROTECTION WITH AN ASYMMETRIC ELEMENT

BACKGROUND AND SUMMARY

The technical solution involves the design of a triggering circuit of overvoltage protection with an asymmetric element representing the area of electrical protection devices designed to restrict overvoltage in a protected distribution network. The overvoltage protection comprises a spark gap connected to input terminal I and input terminal II, whereas a triggering circuit of the overvoltage protection device with an asymmetric element, featuring an asymmetric three-pole arrester, is connected the spark gap in three poles.

Known technical designs of modern lightning arrestors come with an efficient spark gap, equipped with a triggering circuit that quickly actuates the spark gap if impulse overvoltage occurs. Due to its design, the spark gap deactivates quickly, i.e. the flowing follow-on-current is interrupted once the transient overvoltage from the impulse overvoltage has finished. A variety of triggering circuit designs that shall actuate a discharge between main electrode I and main electrode II of the spark gap using an auxiliary electrode contain a transformer. The main drawback of known designs of triggering circuits with a transformer is that the size of the current flowing between the auxiliary electrode and main electrode I or main electrode II of the spark gap is considerably limited by the impedance of the transformer secondary winding, which extends the time necessary to trigger the spark gap; eventually, the transformer secondary winding can be destroyed by thermal overloading due to the limited cross-section of the transformer secondary winding wires, and consequently, the overvoltage protection device loses its functionality, which then endangers the protected equipment by impulse overvoltage.

An example of such a design is document U.S. Pat. No. 6,111,740 "Overvoltage protection system and overvoltage protection element for an overvoltage protection system", where the overvoltage protection device system features a spark gap with two main electrodes and at least one auxiliary electrode connected to the output of the trigger voltage of the triggering circuit. The triggering circuit has a triggering capacitor, ignition triggering element and a transformer that features primary and secondary winding. The output from the secondary winding represents an ignition voltage output from the triggering circuit. The disadvantage of such a design is the secondary winding's high impedance, which limns the current flowing through the auxiliary electrode and one of the main electrodes. Such overloading can result in damage to the triggering circuit and loss of functionality of the overvoltage protection device. Consequently, in the design published in document DE19914313 "Overvoltage protection system for e.g. protecting electronic equipment against transient overvoltages caused by lightning discharge, provides monitoring equipment for ignition circuits with thermal and/or dynamic overload switching off", the ignition circuit is extended with security elements and signaling of the operating condition.

Another known triggering circuit design for overvoltage protection, which forms a constituent part of document FR2902579 "Electrical installation protection device i.e. surge suppressor, has a triggering unit passing spark gaps from the blocking state, in which gaps oppose the current circulation, to the passing state, in which the gaps permit the fault current to flow in branches", deals with the synchronous triggering of two overvoltage elements connected in series, where the overvoltage elements consist of spark gaps, whereas the triggering circuit contains two secondary windings. In this design, the above-stated deficiencies are even greater.

Document U.S. Pat. No. 4,683,514 "Surge voltage protective circuit arrangements" shows an arrangement where a protective resistor is situated between the auxiliary electrode of a spark gap and a transformer secondary winding. The protective resistor partially protects the winding from damaging, at the same time, however, it limits the current, i.e. the triggering ability of the triggering circuit as well, and, at the same time, the arch stability is limited.

Similarly, the design of the triggering circuit of the overvoltage protection as indicated in document US2003007303 "Pressure-resistant encapsulated air-gap arrangement for the draining off of damaging perturbances due to overvoltages" represents only a basic circuit solution. The disadvantage of the secondary winding's high impedance of the transformer persists.

Document CZ25171 "Design of the triggering circuit of overvoltage protection" represents merely an improved circuit design with the persisting disadvantage of secondary windings high impedance.

According to an aspect of the invention, a triggering circuit of the overvoltage protection is provided with an asymmetric element specified for actuating a spark gap either in a symmetric or asymmetric arrangement of main electrode I, connected to input terminal I, main electrode II, connected to input terminal II, and an auxiliary electrode; where the principle of the design features main electrode I of the spark gap connected through a thermo-sensitive disconnector, and also through a parallel combination of varistor II and capacitor I to electrode I of an asymmetric three-pole lightning arrester, whose middle electrode is connected via the transformer primary winding to main electrode II of the spark gap, whose auxiliary electrode is connected via varistor I to electrode II of the asymmetric three-pole lightning arrester, connected to main electrode II of the spark gap via the transformer secondary winding, whereas the thermo-sensitive disconnector is coupled via a thermal coupling with varistor II and, at the same time, the voltage at the asymmetric three-pole lightning, arrester features static ignition voltage U1 between electrode II and the middle electrode is higher than static ignition voltage U2 between the middle electrode and electrode I.

The overvoltage protection comprises a spark gap that features main electrode I, main electrode II and an auxiliary electrode to facilitate easier breakdown between main electrode I and main electrode II, which is enabled by the design of the triggering, circuit of the overvoltage protection with an asymmetric element.

The advantage of such a design of a triggering circuit of overvoltage protection according to an aspect of the invention lies in increased reliability of the triggering, respectively, actuating capability of the triggering circuit due to the used asymmetric element, consisting of or comprising an asymmetric three-pole arrester.

The modified design of the triggering circuit of the overvoltage protection with the asymmetric element mentioned above consists of or comprises condenser II interconnected between the junction connecting electrode I of the asymmetric three-pole lightning arrester with varistor II and capacitor I, and between main electrode II of the spark gap.

Another design according to an aspect of the invention of the triggering circuit of overvoltage protection with an asymmetric element, specified for actuating the spark gap either in a symmetric or asymmetric arrangement of main electrode I, connected to input terminal I, main electrode II, connected to input terminal II, and an auxiliary electrode, comprises spark gap main electrode I, which is connected via a thermo-sensitive disconnector and varistor II to electrode I of the asymmetric three-pole lightning arrester, whose middle electrode is connected via a transformer primary winding to main electrode II of the spark gap, whose auxiliary electrode is connected via varistor I to electrode II of the asymmetric three-pole lightning arrester, connected via the transformer secondary winding to main electrode II of the spark gap, whereas one end of the series combination of resistor and capacitor I is connected to the junction connecting the thermo-sensitive disconnector with varistor II, and its other end is connected to main electrode II of the spark gap, and the thermo-sensitive disconnector is coupled with the thermal coupling with varistor II and, at the same time, the voltage at the asymmetric three-pole lightning arrester is as follows: static ignition voltage U1 between electrode II and the middle electrode is higher than static ignition voltage U2 between the middle electrode and electrode I.

Another possible design according to an aspect of the invention of the triggering circuit of overvoltage protection with an asymmetric element, specified for actuating the spark gap either in a symmetric or asymmetric arrangement of main electrode I, connected to input terminal I, main electrode II, connected to input terminal II and an auxiliary electrode, comprises main electrode I of the spark gap connected via a thermo-sensitive disconnector, and also via a parallel combination of varistor II and capacitor I, to one pole of the voltage dependent triggering element, whose second pole is connected via the transformer primary winding connected to main electrode II of the spark gap, whose auxiliary electrode is connected via varistor I to electrode I of the asymmetric three-pole lightning arrester, which is connected to its middle electrode via varistor III, and the middle electrode is connected via the transformer secondary winding to main electrode II of the spark gap, which is connected to electrode II of the asymmetric three-pole lightning arrester, whereas the thermo-sensitive disconnector is coupled with a thermal coupling with varistor II and, at the same time, the voltage at the asymmetric three-pole lightning arrester is as follows: static ignition voltage U1 between electrode II and middle electrode is higher than static ignition voltage U2 between the middle electrode and electrode I.

The modified above-mentioned design of the triggering circuit of overvoltage protection with an asymmetric element comprises capacitor II interconnected between the junction connecting the voltage-dependent triggering element to varistor II and capacitor I, and between main electrode II of the spark gap.

The last design according to an aspect of the invention of the triggering circuit of overvoltage protection with an asymmetric element specified for actuating the spark gap either in symmetric or asymmetric arrangement of main electrode I, which is connected to input terminal I of main electrode II, connected to input terminal II, and an auxiliary electrode, comprises main electrode I of the spark gap connected via a thermo-sensitive disconnector and varistor II to one pole of the voltage-dependent triggering element, the second pole of which is connected to main electrode II of the spark gap via the transformer primary winding, whereas the auxiliary electrode of the spark gap is connected via varistor I to electrode I of the asymmetric three-pole lightning arrester, and this is connected via varistor III connected with its middle electrode, which is connected via the transformer secondary winding to main electrode II of the spark gap, which is connected to electrode ii of the asymmetric three-pole lightning arrester, whereas one end of the series combination of the resistor and capacitor I is connected to the junction connecting the thermo-sensitive disconnector to varistor II, and its other end is connected to main electrode II of the spark gap, whereas the thermo-sensitive disconnector is coupled with a thermal coupling with varistor II and, at the same time, voltage at the asymmetric three-pole lightning arrester is as follows: static ignition voltage U1 between electrode II and the middle electrode is higher than static ignition voltage U2 between the middle electrode and electrode I.

The designs of the triggering circuit of overvoltage protection with asymmetric element which feature a voltage-dependent triggering element, which beneficially comprises a two-pole arrester or a two-pole electronic circuit based on power triggering semiconductors.

BRIEF DESCRIPTION OF THE DRAWINGS

The technical solution will be explained in detail using drawings, in which.

DETAILED DESCRIPTION

Figure 1:
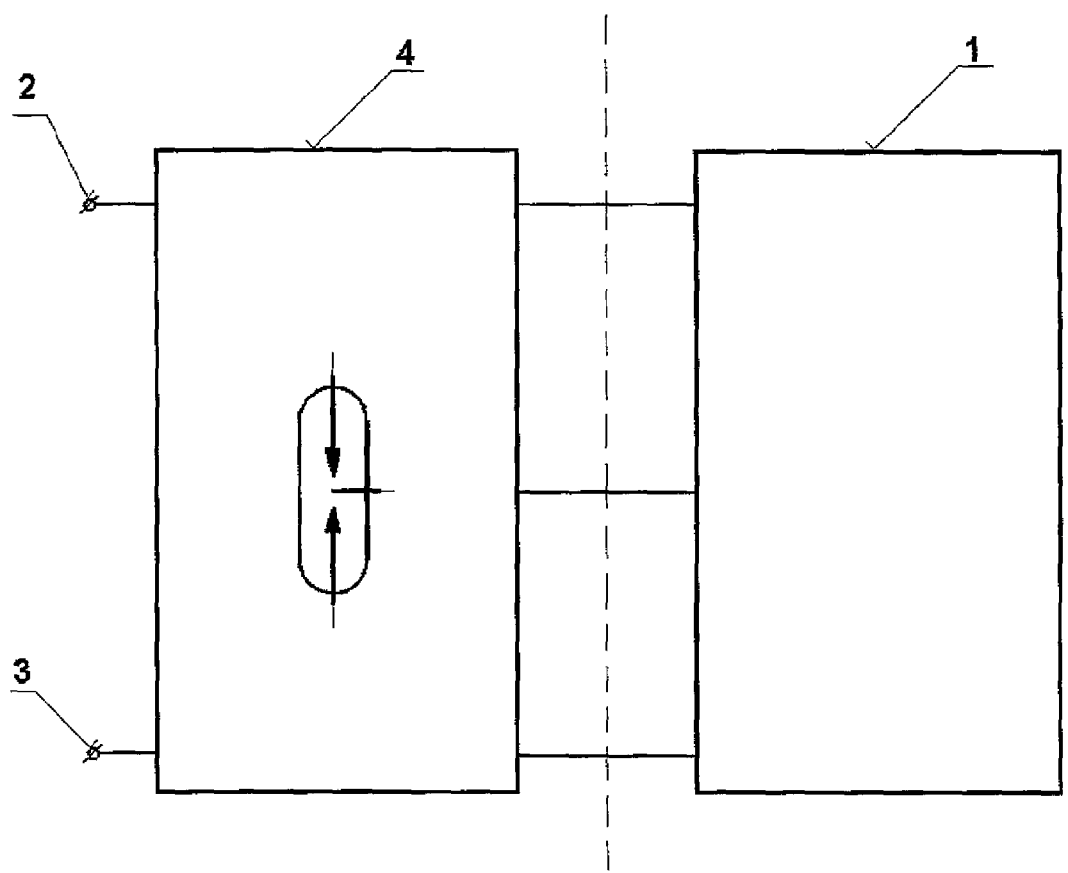
FIG. 1 shows a block diagram of the design of the triggering circuit of overvoltage protection with an asymmetric element.

The wiring diagram of triggering circuit 1 of the overvoltage protection device with an asymmetric element according, to FIG. 1 comprises a spark gap 4 connected to input terminal I 2 and input terminal II 3, whereas triggering circuit 1 of the overvoltage protection device with an asymmetric element is connected in three poles to the spark gap 4.

Figure 2:
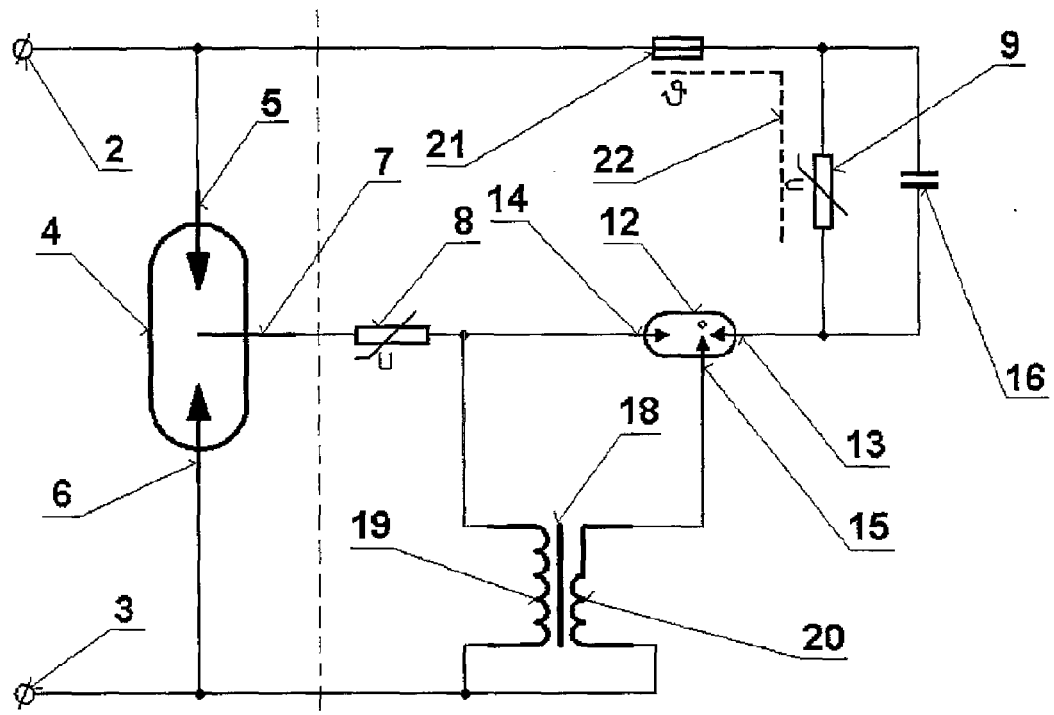
FIG. 2 shows the fundamental wiring diagram of the triggering circuit of overvoltage protection with an asymmetric element, including a transformer, asymmetric three-pole lightning arrester, varistor I, varistor II, capacitor I and a thermo-sensitive disconnector.

The design of the triggering circuit 1 of the overvoltage protection device with an asymmetric element according to FIG. 2, specified fir actuating the spark gap 4 in either symmetric or asymmetric arrangement of main electrode I 5, connected to input terminal I 2, main electrode II 6, connected to input terminal II 3, and an auxiliary electrode 7; comprises main electrode I 5 of the spark gap 4, connected via the thermo-sensitive disconnector 21, and also via the parallel combination of varistor II 9 and capacitor I 16 to electrode I 13 of the asymmetric three-pole lightning arrester 12, whose middle electrode 15 is connected via the primary winding 20 of the transformer 18 to main electrode II 6 of the spark gap 4, whose auxiliary electrode 7 is connected via varistor I 8 to electrode II 14 of the asymmetric three-pole lightning arrester 12, which is connected via the secondary winding 19 of the transformer 18 to main electrode II 6 of the spark gap 4, whereas the thermo-sensitive disconnector 21 is coupled with the thermal coupling 22 with varistor II 9 and, at the same time, the voltage at the asymmetric three-pole lightning arrester 12 is as follows: static ignition voltage U1 between electrode II 14 and the middle electrode 15 is higher than static ignition voltage U2 between the middle electrode 15 and electrode I 13.

The function of the design of the triggering circuit 1 of the overvoltage protection device according to FIG. 2 lies in the following: with no overvoltage condition there is operating voltage of the protected distribution network between input terminal I 2 and input terminal II 3, and such voltage is not sufficient to discharge a spark between electrode I 13 and the middle electrode 15 of the asymmetric three-pole lightning arrester 12. If impulse overvoltage occurs between input terminal I 2 and input terminal II 3, a discharge spark occurs between electrode I 13 and the middle electrode 15 of the asymmetric three-pole lightning arrester 12, whereas varistor II 9 will reduce its resistance and the current impulse flowing through the primary winding 20 of the transformer 18 induces high voltage in its secondary winding 19, and the high voltage is fed via varistor I 8 to the auxiliary electrode 7 of the spark gap 4 and consequently, a discharge spark occurs between the auxiliary electrode 7 and main electrode I 5 or main electrode II 6 of the spark gap 4. Varistor I 8 helps maintain the discharge by reducing its resistance in a drop. Consequently, as a result of the ionised space between main electrode I 5 and main electrode II 6 of the spark gap 4, a discharge spark occurs between main electrode I 5 and main electrode II 6 of the spark gap 4. Then, due to the ionised space between electrode I 13 and the middle electrode 15 of the asymmetric three-pole lightning arrester 12, the space between electrode II 14 and the middle electrode 15 of the asymmetric three-pole lightning arrester 12 will also be ionised and a discharge spark occurs between electrode II 14 and the middle electrode 15 and a drop reduction of the inner impedance between them, which is why the primary winding 20 of the transformer 18 with lower impedance in parallel to the secondary winding 19 of the transformer 18 with higher internal impedance, which considerably increases the current in the auxiliary electrode 7 of the spark gap 4 and this will improve reliability of the actuating, respectively, ionising effect of the auxiliary electrode 7 of the spark gap 4.

With the voltage drop between main electrode I 5 and main electrode II 6 of the spark gap 4, the current flowing through the auxiliary electrode 7 decreases gradually as well, varistor I 8 will increase its resistance, similarly, varistor II 9 increases its resistance as well, and both return to the initial condition, consequently, the current flowing between the auxiliary electrode 7 and main electrode I 5 or main electrode II 6 of the spark gap 4 will cease. The asymmetric three-pole lightning arrester 12 returns to its original condition featuring high inner impedance. The capacitor 16 improves the dynamic properties of the triggering circuit.

The thermo-sensitive disconnector 21 allows the triggering circuit 1 of the overvoltage protection device to be disconnected from the protected distribution network in the event of thermal overloading and impermissible heating or overheating of varistor II 9.

Figure 3:
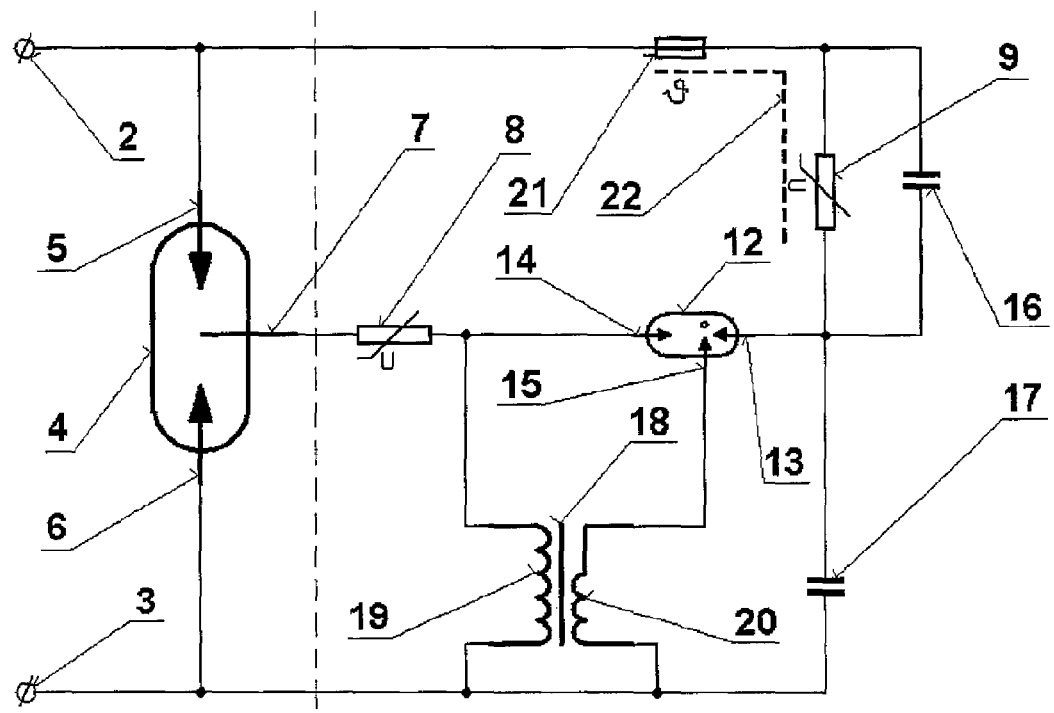
FIG. 3 shows the fundamental wiring diagram of the triggering circuit of overvoltage protection with an asymmetric element, including a transformer, asymmetric three-pole lightning arrester, varistor I, varistor II, capacitor I, capacitor II and a thermo-sensitive disconnector.

The modified design of the triggering circuit 1 of the overvoltage protection device with an asymmetric element according to FIG. 3 mentioned above, comprises the following: capacitor II 17 is interconnected between the junction connecting electrode I 13 of the asymmetric three-pole lightning arrester 12 to varistor II 9 and capacitor I 16, and between main electrode II 6 of the spark gap 4.

Figure 4:
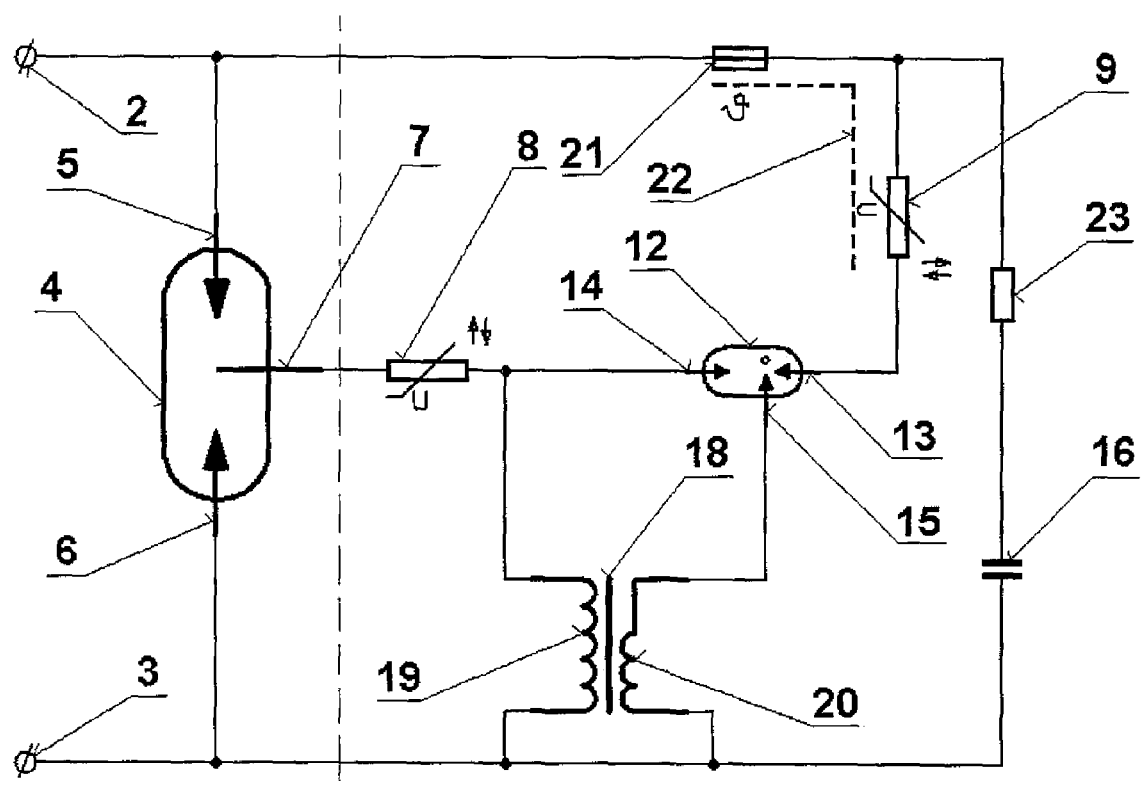
FIG. 4 shows the fundamental wiring diagram of the triggering circuit of overvoltage protection with an asymmetric element, comprising transformer 18, an asymmetric three-pole lightning arrester, varistor I, varistor II, capacitor I, resistor and a thermo-sensitive disconnector.

Another design of the triggering circuit 1 of the overvoltage protection device with an asymmetric element according to FIG. 4, specified for actuating the spark gap 4 in either symmetric or asymmetric arrangement of main electrode I 5 connected to input terminal I 2, main electrode II 6, connected to input terminal II 3, and an auxiliary electrode 7, comprises main electrode I 5 of the spark gap 4 connected via a thermo-sensitive disconnector 21 and via varistor II 9 k to electrode I 13 of the asymmetric three-pole lightning arrester 12, whose middle electrode 15 is connected via primary winding, 20 of the transformer 18 to main electrode II 6 of the spark gap 4, whose auxiliary electrode 7 is connected via varistor I 8 to electrode II 14 of the asymmetric three-pole lightning arrester 12, which is connected via the secondary winding 19 of the transformer 18 to main electrode II 6 of the spark gap 4, whereas a series combination of the resistor 23 and capacitor I 16 connected in parallel is connected to the junction connecting the thermo-sensitive disconnector 21 to varistor II 9 from one of its ends, and from the other end to main electrode II 6 of the spark gap 4, whereas the thermo-sensitive disconnector 21 is coupled with the thermal coupling 22 with varistor II 9 and, at the same time, the voltage at the asymmetric three-pole lightning arrester 12 is such that static ignition voltage U1 between electrode II 14 and the middle electrode 15 is higher than static ignition voltage U2 between the middle electrode 15 and electrode I 13.

Figure 5:
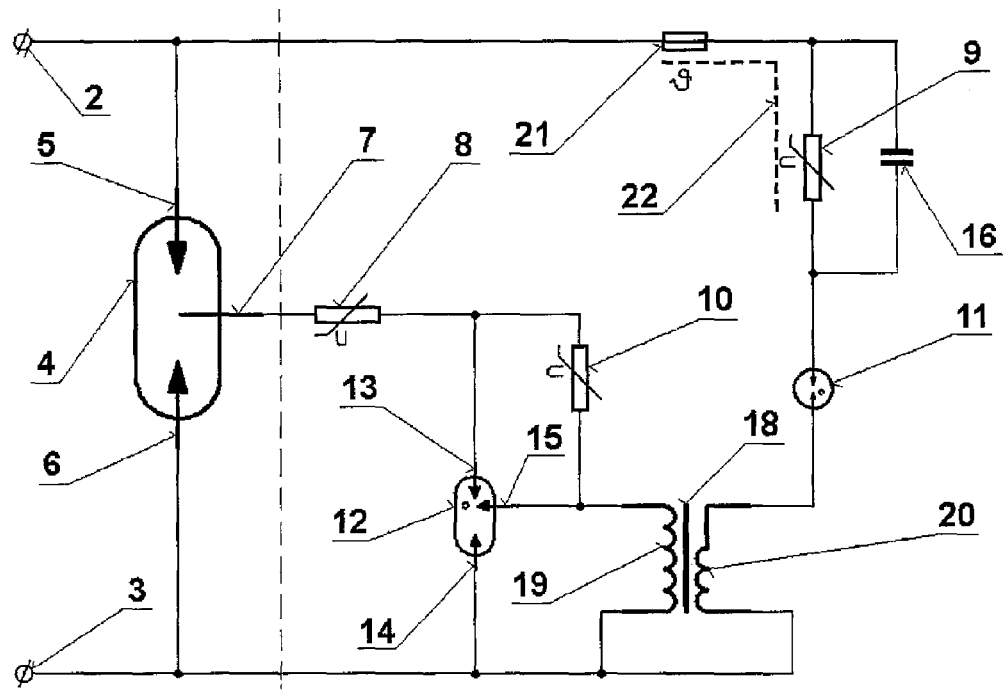
FIG. 5 shows the fundamental wiring diagram of the triggering circuit of overvoltage protection with an asymmetric element, comprising a transformer, asymmetric three-pole lightning arrester, varistor I, varistor II, varistor III, a two-pole lightning arrester, capacitor I and a thermo-sensitive disconnector.

Another possible design of the triggering circuit 1 of the overvoltage protection device with an asymmetric element according to FIG. 5, specified for actuating the spark gap 4 in a symmetric or asymmetric arrangement of main electrode I 5, connected to input terminal I 2, of main electrode II 6, connected to input terminal II 3, and auxiliary electrode 7, comprises main electrode I 5 of the spark gap 4 connected via the thermo-sensitive disconnector 21, and also via the combination of varistor II 9 and capacitor I 16 connected in parallel to one pole of the voltage-dependent triggering element 11, the second pole of which is connected via the primary winding 20 of the transformer 18 to main electrode II 6 of the spark gap 4, whose auxiliary electrode 7 is connected via varistor I 8 to electrode I 13 of the asymmetric three-pole lightning arrester 12, which is connected via varistor III 10 to its middle electrode 15, and the middle electrode is connected via the secondary winding 19 of the transformer 18 to main electrode II 6 of the spark gap 4, and main electrode II is connected to electrode II 14 of the asymmetric three-pole lightning, arrester 12, whereas the thermo-sensitive disconnector 21 is coupled with the thermal coupling 22 with varistor II 9 and, at the same time, the voltage at the asymmetric three-pole lightning arrester 12 is such that static ignition voltage U1 between electrode II 14 and the middle electrode 15 is higher than static ignition voltage U2 between the middle electrode 15 and electrode I 13.

Figure 6:
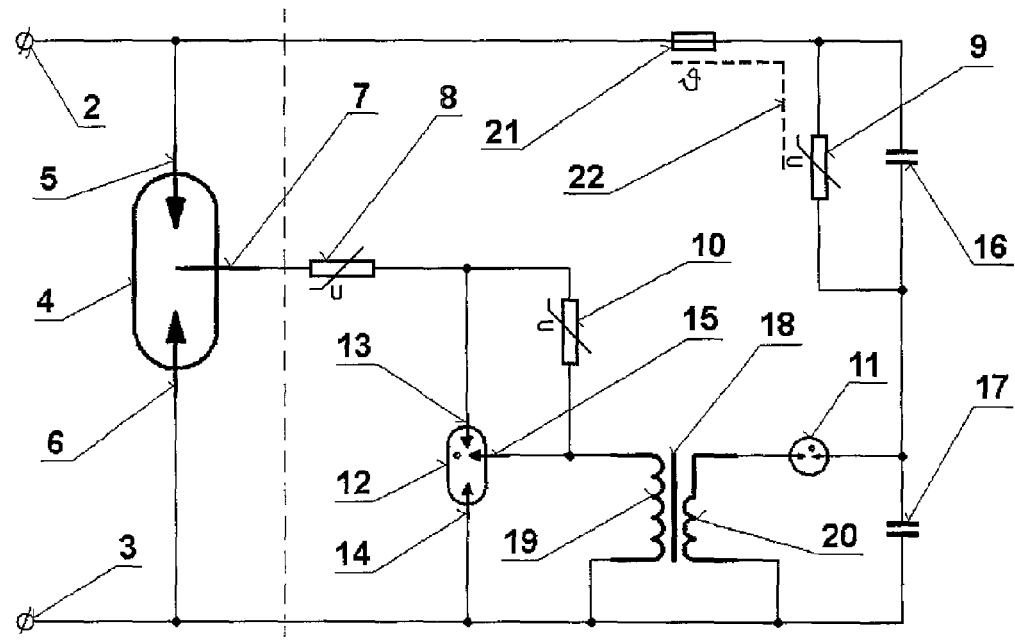
FIG. 6 shows the fundamental wiring diagram of the triggering circuit of overvoltage protection with an asymmetric element, comprising a transformer, asymmetric three-pole lightning arrester, varistor I, varistor II, varistor III, a two-pole lightning arrester, capacitor I, capacitor II and a thermo-sensitive disconnector.

The modified design of the triggering circuit 1 of the overvoltage protection device with an asymmetric element according to FIG. 6 stated above comprises capacitor II 17 interconnected between the junction connecting the voltage dependent triggering element 11 to varistor II 9 and capacitor I 16, and between main electrode II 6 of the spark gap 4.

Figure 7:
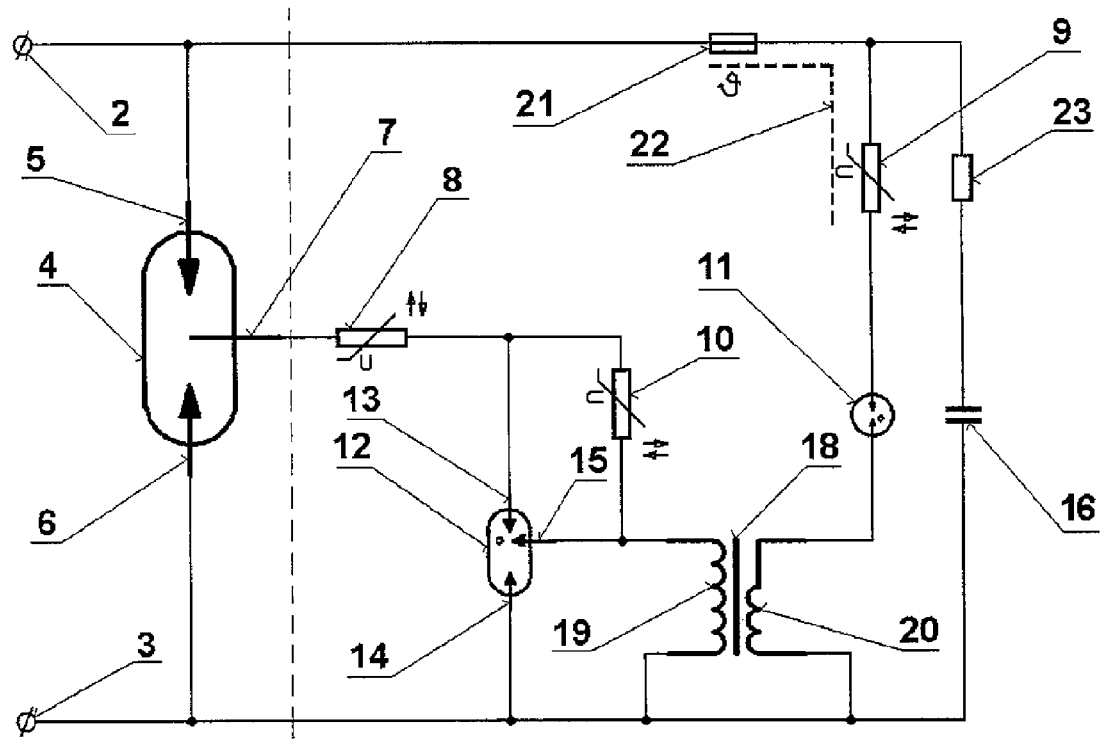
FIG. 7 shows the fundamental wiring diagram of the triggering circuit of overvoltage protection with an asymmetric element, comprising a transformer, asymmetric three-pole lightning arrester, varistor I, varistor II, varistor III, a two-pole lightning arrester, capacitor I, resistor and a thermo-sensitive disconnector.

The latter design of the triggering circuit 1 of the overvoltage protection device with an asymmetric element according to FIG. 7, specified for actuating the spark gap 4 in symmetric or asymmetric arrangement of main electrode I 5, connected to input terminal I 2, of main electrode II 6, connected to input terminal II 3, and auxiliary electrode 7, comprises main electrode I 5 of the spark gap 4, where main electrode I is connected via the thermo-sensitive disconnector 21 and varistor II 9 to one pole of the voltage-dependent triggering element 11, the second pole of which is connected via the primary winding 20 of the transformer 18 to main electrode II 6 of the spark gap 4, whose auxiliary electrode 7 is connected via varistor I 8 to electrode I 13 of the asymmetric three-pole lightning arrester 12, which is connected via varistor III 10 to its middle electrode 15, and this is connected via the secondary winding 19 of the transformer 18 connected to main electrode II 6 of the spark gap 4, and main electrode II 6 is connected to electrode II 14 of the asymmetric three-pole lightning, arrester 12, whereas a combination of the resistor 23 and capacitor I 16 connected in series is connected from one of its ends to the junction connecting the thermo-sensitive disconnector 21 to varistor II 9, and its other end is connected to main electrode II 6 of the spark gap 4, whereas the thermo-sensitive disconnector 21 is coupled with the thermal coupling 22 with varistor II 9 and, at the same time, the voltage at the asymmetric three-pole lightning arrester 12 is such that static ignition voltage U1 between electrode II 14 and the middle electrode 15 is higher than static ignition voltage U2 between the middle electrode 15 and electrode I 13.

The designs of the triggering circuit 1 of the overvoltage protection device with an asymmetric element according to FIG. 5, or 6, or 7, which comprise the voltage-dependent triggering element 11, are advantageous because they comprise a two-pole arrester or a two-pole electronic circuit based on power triggering semiconductors.

Concerning the circuit elements connected in series, such as in FIG. 4 or 7, the resistor 23 and capacitor I 16, or in FIG. 7 varistor II 9, the voltage-dependent triggering element 11 and the primary winding 20 of the transformer 18, the functionality of the design of the triggering circuit 1 will be maintained even with a different order of the circuit elements connected in series.

Figure 8:
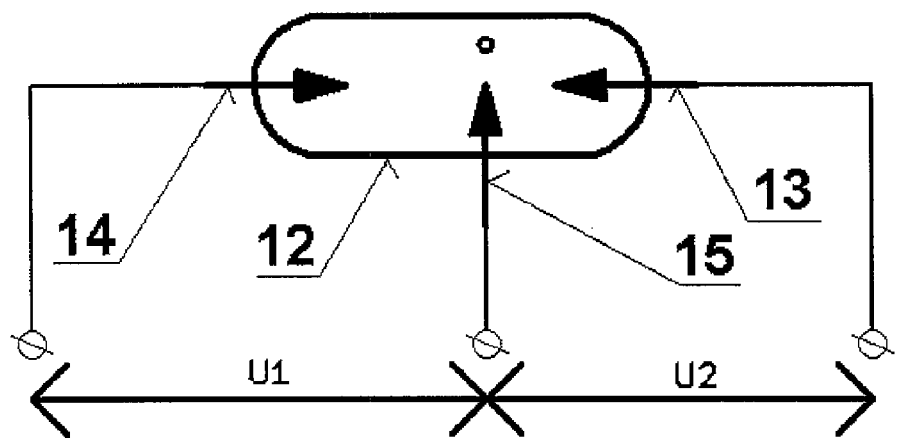
FIG. 8 shows the voltage system at the asymmetric three-pole lightning arrester.

FIG. 8 shows the voltage at the asymmetric three-pole lightning arrester 12, whereas the condition that static ignition voltage U1 between electrode II 14 and the middle electrode 15 is higher than static ignition voltage U2 between the middle electrode 15 and electrode I 13, must be met for all designs of the triggering circuit 1 of the overvoltage protection device with an asymmetric element, comprising the asymmetric three-pole arrester 12.

INDUSTRIAL APPLICABILITY

The design of the triggering circuit of overvoltage protection with an asymmetric element according to this technical solution can be used in all applications where the equipment connected to the distribution network is at risk of overvoltage, in particular as a result of lightning strike current. In comparison with known designs, this solution features an improved triggering capability, which results in a shortening of the time necessary to ignite the spark gap and at the same time, it reduces the risk of damaging the transformer secondary winding by thermal overloading and consequently, prevents subsequent. damage resulting from damaged overvoltage protection as a whole.

The invention claimed is:

1. A triggering circuit of an overvoltage protection device with an asymmetric element, specified for actuating a spark gap in a symmetric or an asymmetric arrangement of a main electrode I, connected to an input terminal I, of a main electrode II, connected to an input terminal II, and an auxiliary electrode, comprises a main electrode I of a spark gap, which is connected via a thermo-sensitive disconnector, and also via a parallel combination of a varistor II and a capacitor I to an electrode I of an asymmetric three-pole lightning arrester, whose middle electrode is connected via a primary winding of a transformer to the main electrode II of the spark gap, whose auxiliary electrode is connected via varistor I to electrode II of the asymmetric three-pole lightning arrester, which is connected via a secondary winding of the transformer to the main electrode II of the spark gap, and at the same time, a thermo-sensitive disconnector is coupled via a thermal coupling with varistor II and, at the same time, a voltage at the asymmetric three-pole lightning arrester is as follows: static ignition voltage U1 between electrode II and the middle electrode is higher than static ignition voltage U2 between the middle electrode and electrode I.

2. The triggering circuit of the overvoltage protection device with the asymmetric element, according to claim 1, comprising a capacitor II interconnected between a junction connecting electrode I of the asymmetric three-pole lightning arrester to the varistor II and the capacitor I, and between main electrode II of the spark gap.

3. A triggering circuit of an overvoltage protection device with an asymmetric element, specified for actuating a spark gap in a symmetric or an asymmetric arrangement of a main electrode I, connected to an input terminal I, of a main electrode II, connected to an input terminal II, and an auxiliary electrode, comprises a main electrode I of a spark gap, connected via a thermo-sensitive disconnector and via a varistor II to an electrode I of a asymmetric three-pole lightning arrester, whose middle electrode is connected via a primary winding of a transformer to main electrode II of the spark gap, whose auxiliary electrode is connected via a varistor I to electrode II of the asymmetric three-pole lightning arrester, which is connected via a secondary winding of a transformer connected to main electrode II of the spark gap, whereas a combination of a resistor and a capacitor I connected in series is connected from one of its ends to a junction connecting the thermo-sensitive disconnector to the varistor II, and from its other end to the main electrode II of the spark gap, whereas the thermo-sensitive disconnecter is coupled via the thermal coupling with varistor II and, at the same time, voltage at the asymmetric three-pole lightning arrester is such that static ignition voltage U1 between electrode II and the middle electrode is higher than static ignition voltage U2 between the middle electrode and electrode I.

4. A triggering circuit of an overvoltage protection device with an asymmetric element, specified for actuating a spark gap in a symmetric or an asymmetric arrangement of a main electrode I, connected to an input terminal I, of a main electrode II, connected to an input terminal II, and an auxiliary electrode, comprising a main electrode I of the spark gap, which is connected via a thermo-sensitive disconnector, and also via the combination of a varistor II and a capacitor I connected in parallel to one pole of a voltage-dependent triggering element, whose second pole is connected via a primary winding of a transformer connected to the main electrode II of the spark gap, whose auxiliary electrode is connected via varistor I connected to an electrode I of the asymmetric three-pole lightning arrester, which is connected via a varistor III connected to its middle electrode, and this electrode is connected via a secondary winding of the transformer to the main electrode II of the spark gap, which is connected to electrode II of the asymmetric three-pole lightning arrester, whereas the thermo-sensitive disconnector is coupled via a thermal coupling with the varistor II and, at the same time, the voltage at an asymmetric three-pole lightning arrester is such that static ignition voltage U1 between electrode II and the middle electrode is higher than static ignition voltage U2 between the middle electrode and electrode I.

5. The triggering circuit of the overvoltage protection device with the asymmetric element, according to claim 4, comprising a capacitor II interconnected between a junction connecting the voltage-dependent triggering element to the varistor II and the capacitor I, and between main electrode II of the spark gap.

6. A triggering circuit of an overvoltage protection device with an asymmetric element, specified for actuating a spark gap in a symmetric or an asymmetric arrangement of a main electrode I, connected to an input terminal I, of a main electrode II, connected to an input terminal II, and an auxiliary electrode, comprises a main electrode I of a spark gap connected via a thermo-sensitive disconnector and via varistor II to one pole of a voltage dependent triggering element, whose second pole is connected via a primary winding of a transformer to main electrode II of the spark gap, whose auxiliary electrode is connected via varistor I to electrode I of the asymmetric three-pole lightning arrester, which is connected via varistor III to its middle electrode, and this is connected via a secondary winding of the transformer to main electrode II of the spark gap, and which is connected to electrode II of the asymmetric three-pole lightning arrester, whereas a combination of a resistor and a capacitor I connected in series is connected from one of its ends to a junction connecting the thermo-sensitive disconnector to varistor II, and the other end is connected to main electrode II of the spark gap, whereas the thermo-sensitive disconnector is coupled with the thermal coupling with varistor II and, at the same time, the voltage at the asymmetric three-pole lightning arrester is such that static ignition voltage U1 between electrode II and the middle electrode is higher than static ignition voltage U2 between the middle electrode and electrode I.

7. The triggering circuit of the overvoltage protection device with the asymmetric element, according to claim 6, comprising a voltage-dependent triggering element which features a two-pole lighting arrester or two-pole electronic circuit based on power triggering semiconductors.

* * * * *